United States Patent [19]
Cadd

[11] Patent Number: 5,894,593
[45] Date of Patent: Apr. 13, 1999

[54] METHOD AND APPARATUS FOR ENHANCING THE DETECTION OF THE PRESENCE OF AN FM SIGNAL USING A CODED PATTERN

[75] Inventor: Jimmy W. Cadd, Coral Springs, Fla.

[73] Assignee: Motorola, Inc., Schaumburg, Ill.

[21] Appl. No.: 08/740,804

[22] Filed: Nov. 4, 1996

[51] Int. Cl.[6] .................................................. H04B 1/06
[52] U.S. Cl. ............................ 455/254; 455/63; 455/214
[58] Field of Search .................................. 455/254, 67.1, 455/67.4, 67.5, 410, 517, 214, 336, 337, 296, 309, 63; 375/208

[56] References Cited

U.S. PATENT DOCUMENTS 5,150,377  9/1992  Vannuchi ..................................... 375/1
5,448,760  9/1995  Frederick .................................. 455/410
5,513,184  4/1996  Vannuchi ................................. 455/422
5,555,551  9/1996  Rudokas et al. ........................ 455/410
5,649,304  7/1997  Cabot ...................................... 455/67.4
5,706,333  1/1998  Grenning et al. ....................... 455/67.1

Primary Examiner—Edward F. Urban
Attorney, Agent, or Firm—Andrew S. Fuller

[57] ABSTRACT

Enhanced detection of an FM signal is provided through the use of a coded pattern signal which is processed at a receiver (120) non-linearly to facilitate pattern detection. The received signal is conditioned to limit signal amplitudes according to a particular noise threshold (530, 540, 550). The conditioned signal is then processed to determine the presence of the coded pattern (560). In this manner, the probability of detecting signals in weak signal conditions can be enhanced, while maintaining a particular detection falsing rate.

18 Claims, 4 Drawing Sheets

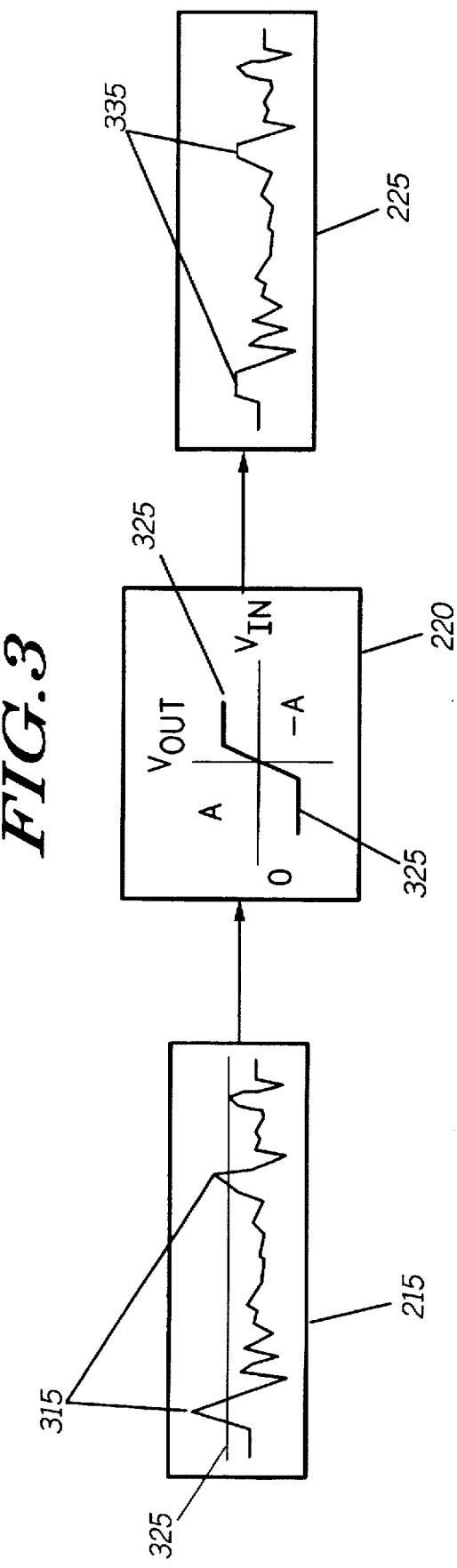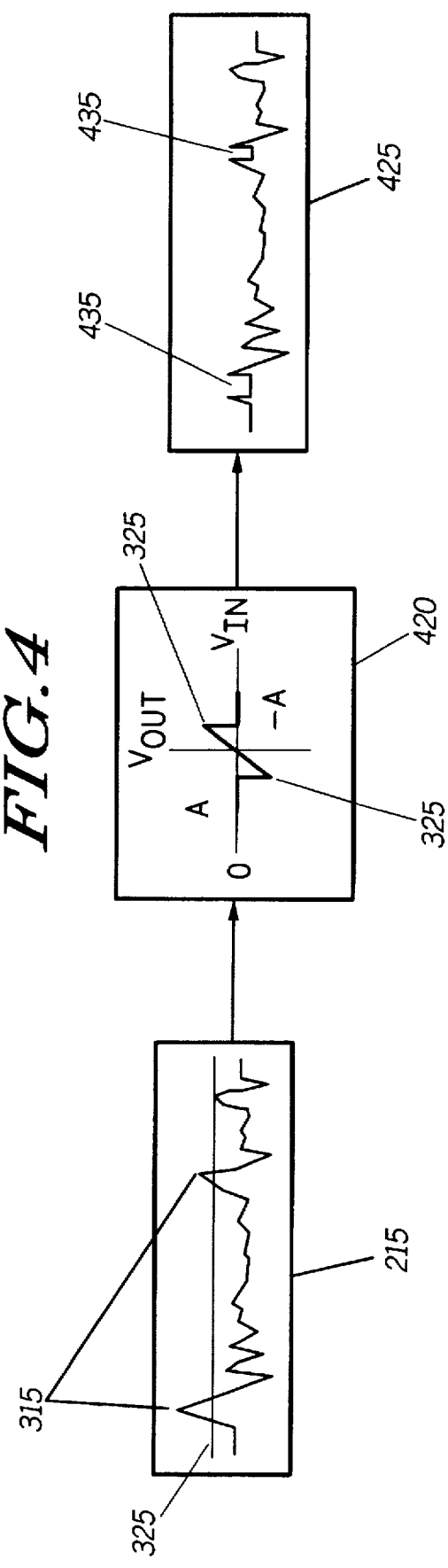

1

METHOD AND APPARATUS FOR ENHANCING THE DETECTION OF THE PRESENCE OF AN FM SIGNAL USING A CODED PATTERN

TECHNICAL FIELD

This invention relates in general to radio communication devices, and more particularly, to detection of frequency or angle modulated signals in radio communications.

BACKGROUND OF THE INVENTION

In radio communication systems, it is often desirable to improve the probability of detection of a communicated signal. For signals communicated using frequency modulation (FM), much attention has been paid to improving receiver sensitivity to communicated signals in the presence of noise. Receiver sensitivity can be improved by an approach known as noise threshold extension. Various techniques have been proposed for noise threshold demodulators. Among these techniques are the use of phase locked loops and frequency modulation feedback arrangements in the receiver. Such techniques reduce the influence of noise and undesired signals during the demoulation process. By extending the noise threshold, the receiver becomes more sensitive to weak signals thus increasing the probability of the detecting a communicated signal.

Noise affecting signals may arise from internal and external sources. Internal noise may be created through thermal energy generated during operation of circuitry used to process the signals. This type of internal noise is generally referred to as thermal noise. The impact of thermal noise on receiver sensitivity can be substantial when attempting to detect weak signals, particular those below the noise threshold of a receiver. When the input signal is sufficiently small, so as to be below the noise threshold, the operation of the demodulation process results in an increase in noise at the output. As a result, it becomes substantially more difficult to detect such signals.

In many situations, it is desirable to extended the range of certain transmissions made for signaling purposes. By improving receiver sensitivity, the effective range of a communicated signal is increased. However, thermal noise and other factors present an impediment to improved receiver sensitivity. Therefore, a new approach to enhancing signal detection for frequency modulated communications is needed.

BRIEF DESCRIPTION OF THE DRAWINGS

FIG. 3 is a graphical representation of the operation of a soft-limiter, in accordance with the present invention.

FIG. 4 is a graphical representation of the operation of a blanker that provides non-linear signal processing for signal conditioning, in accordance with the present invention.

DETAILED DESCRIPTION OF THE PREFERRED EMBODIMENT

The present invention provides for enhanced detection of signaling information transmitted using angle modulation in general, and frequency modulation (FM) as a particular instance thereof. An FM signal is formed by coding signaling information according to a particular pattern, which in the preferred embodiment corresponds to a pseudo noise (PN) sequence. For detection purposes, a derivative of the FM signal is conditioned to limit signal amplitude according to a noise threshold, preferably based on a particular maximum pattern falsing rate. A pattern detector determines whether the conditioned signal contains the particular pattern, by correlating the particular pattern with, or otherwise applying the particular pattern to, the conditioned signal. In the preferred embodiment, the demodulated signal is processed by a soft-limiter to generate the conditioned signal, and a pattern matched filter is used in pattern detection. By limiting signal amplitude of noise spikes according to a noise threshold when attempting to detect weak signals, the impact of thermal and other noise on the detection process is reduced.

Figure 1:
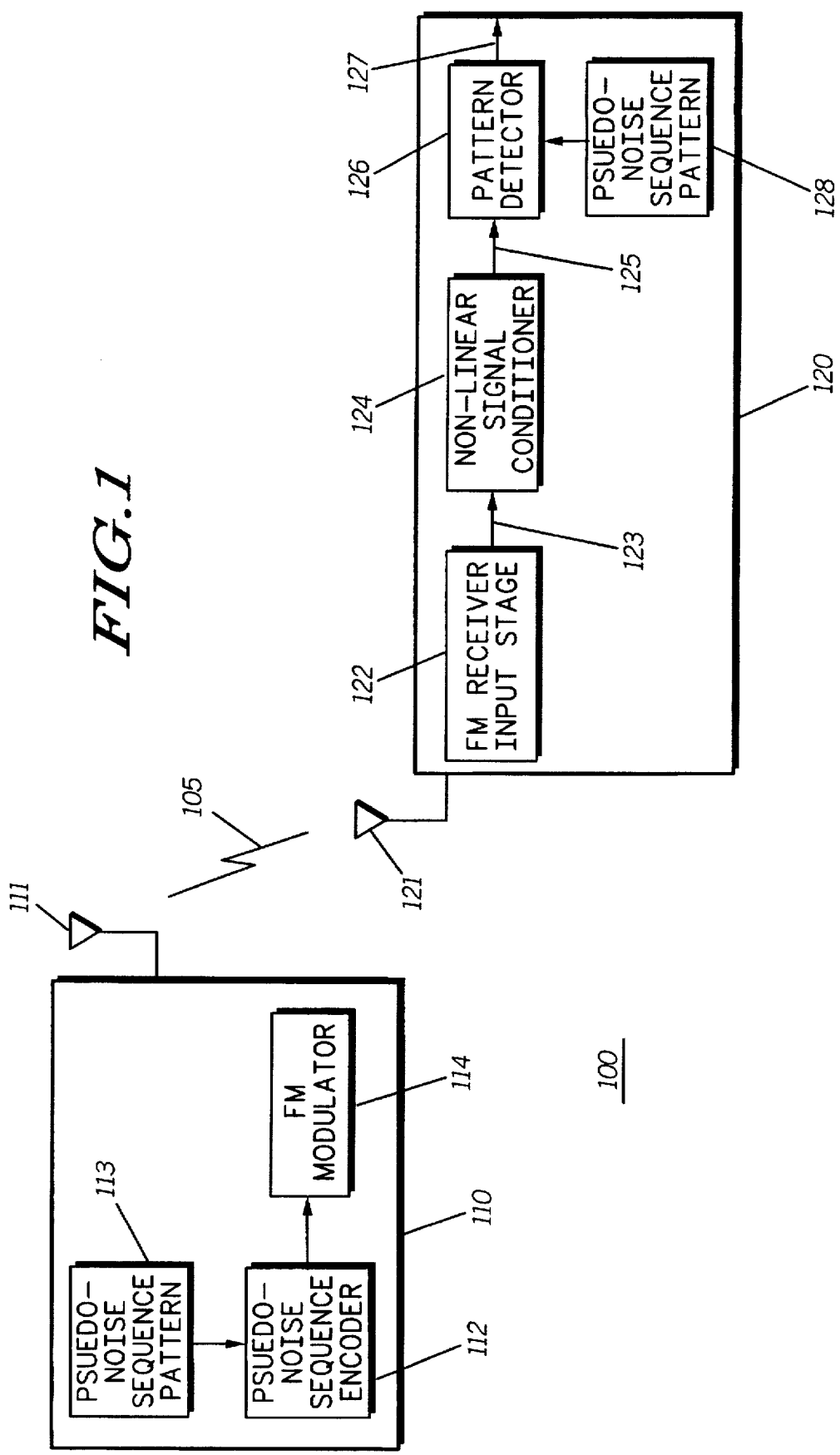
FIG. 1 is a block diagram of a radio communication system that communicates using FM signals, in accordance with the present invention.

FIG. 1 is a block diagram of a radio communication system 100 that communicates using FM signals. The communication system 100 includes one communication device 110 that functions as a transmitter, and another communication device 120 that functions as a receiver. Only the portions of the communication devices 110, 120 relevant to the invention are shown. The transmitter 110 includes, for the purposes of signaling, a PN sequence encoder 112 that is coupled to an FM modulator 114. The receiver 120 includes, as functional blocks, an FM receiver input stage 122, a non-linear signal conditioner 124, and a pattern detector 126. In the preferred embodiment, a PN sequence is used to modulate a carrier signal using frequency modulation for transmission. Correspondingly, the PN sequence is automatically correlated at the receiver end to improve overall system sensitivity. This combination effectively extends the range of signaling information transmitted using FM.

At the transmitter 110, the encoder 112 encodes a PN sequence 113 which is modulated by the FM modulator 114, and the corresponding FM signal 105 transmitted via antenna 111. At the receiver 120, the FM signal 105 is received via antenna 121. The signal input stage 122 provides an information signal 123 corresponding to the FM signal 105. The signal conditioner 124 is coupled to the information signal 123 and has an output of a conditioned signal 125 corresponding to the information signal 123 with signal amplitude peaks limited according to a particular threshold. The pattern detector 126 is coupled to the conditioned signal 125 and has a pattern detect output 127 based on an application of a pattern 128 to the conditioned signal 125. Preferably, the signal conditioner 124 utilizes non-linear signal processing, such as soft-limiting or blanking.

Figure 2:
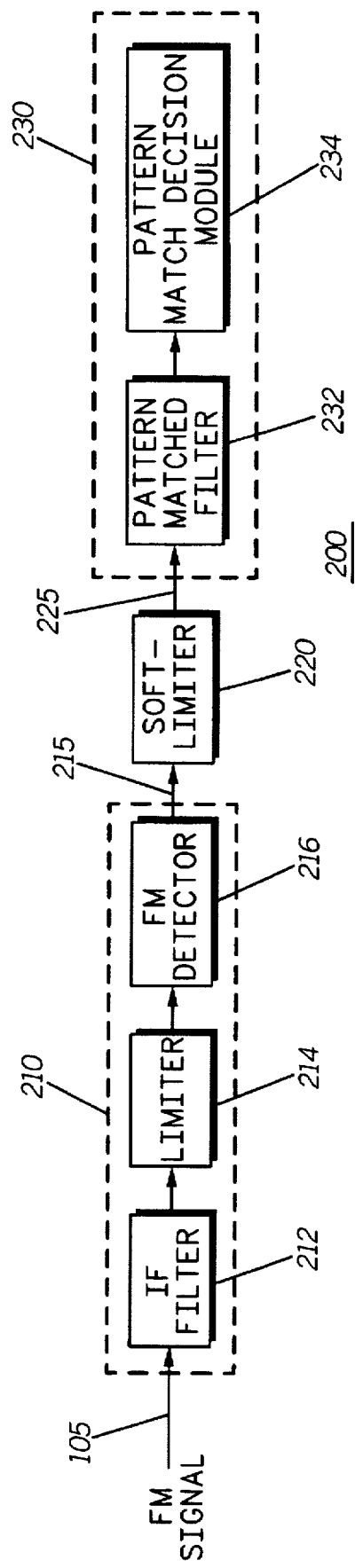
FIG. 2 is a block diagram highlighting significant functional blocks of a receiver employing a soft-limiting non-linear processor for signal conditioning, in accordance with the present invention.

FIG. 2 is a block diagram highlighting significant functional blocks of a receiver 200 employing soft-limiting non-linear processor for signal conditioning, in accordance with the present invention. The receiver 200 includes an intermediate frequency (IF) filter 212, a limiter 214, and an FM detector 216, which together function as a conventional receiving stage 210. The receiving stage 210 processes the FM signal 105 in an attempt to extract the originally transmitted information signal.

In weak signal conditions, the probability of a false detection of a particular FM signal is increased for a fixed decision threshold at a signal detector. This is a result of the well known FM threshold effect, which during weak signal conditions, causes the noise voltage at the FM detector output to increase relative to the desired signal. It is this increase in noise voltage which gives rise to the degradation of signal detection performance.

According to the invention, two steps are taken to enhance the probability of detecting an FM signal in weak signal conditions without significantly increasing the probability of false detection. First, a coded pattern is transmitted for detection. The coded pattern is preferably a pseudo noise sequence. Second, the signal from the demodulation process is conditioned before application of a pattern detector to detect the coded pattern.

In this particular embodiment, the receiver structure 200 includes a soft-limiter 220 that generates a conditioned signal 225 after demodulation. Further, a pattern matched filter 232 and a pattern match decision module 234 together function as a pattern detector 230 that is applied to the conditioned signal 225. The soft-limiter 220 operates on the demodulated signal to limit the amplitude of signals having signal amplitudes above a particular noise threshold, while not affecting the amplitude of signals having signal amplitudes below the particular noise threshold. FIG. 3 is a graphical representation of the operation of the soft-limiter. The soft-limiter 220 establishes a threshold 325 for limiting input signals to create an output signal. Thus, when the demodulated signal 215 has signal amplitude peaks 315 exceeding the threshold 325, the signal amplitude peaks are clipped or otherwise limited such that new peaks 335 are created which does not exceed the threshold limit value (A) 325.

Referring again to FIG. 2, the pattern matched filter 232 applies the coded pattern to the conditioned signal 225, preferably using a correlation process, and the pattern match decision module 234 makes detection decisions based on a predefined pattern detect threshold value. For example, if for a given pseudo noise sequence the filtered sequence is greater than the pattern detection threshold value, a pattern detect output results. The pattern match decision module 234 may be implemented using a comparator. By employing a coded pattern, such as the pseudo noise sequence, and by limiting the amplitude of signals, the present invention allows for increased probability of detecting weak signals without significantly increasing the probability of falsing.

In an alternative embodiment, a blanker may be used instead of the soft-limiter 220 to provide non-linear signal conditioning. FIG. 4 illustrates the function of a blanker 420, in accordance with the present invention. The threshold (A) 325 is established at the blanker 420 for limiting input signals 215 to create a conditioned output signal 425. Thus, when the demodulated signal 215 has signal amplitude peaks 315 exceeding the threshold 325, the conditioned signal 425 has signal amplitude peaks 435 which are clamped or blanked, thereby effectively zeroing or substantially reducing the amplitude of those portions of the signal.

Figure 5:
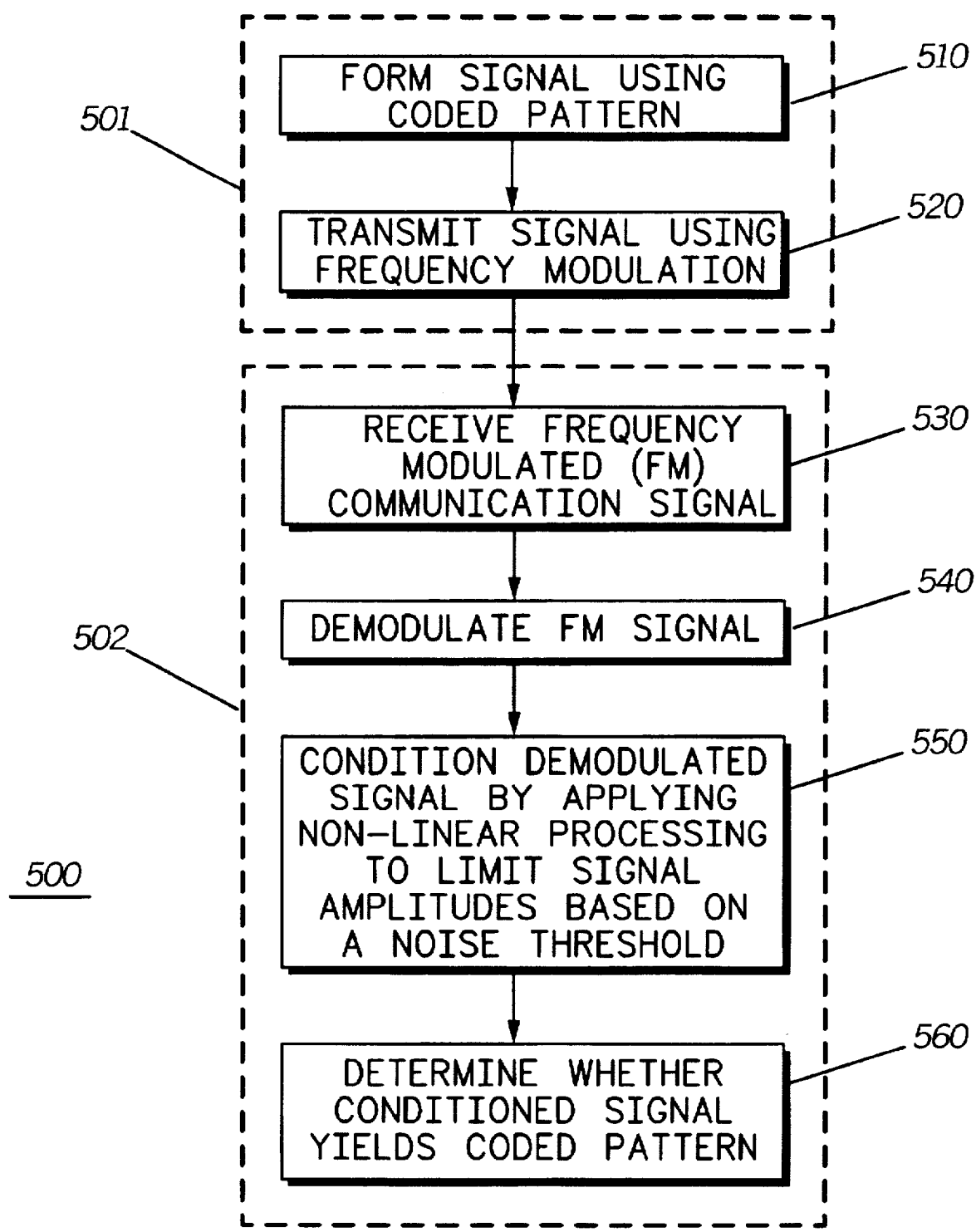
FIG. 5 is a flowchart of procedures summarizing enhanced detection of signaling information transmitted using FM, in accordance with the present invention.

FIG. 5 is a flowchart 500 of procedures summarizing enhanced detection of signaling information transmitted using frequency modulation. At a transmitter 501, a communication signal is formed using a coded pattern, such as a pseudo noise sequence, step 510. This signal is transmitted on a communication channel using frequency modulation, step 520. The use of a pseudo noise sequence or other coded pattern enhances the probability of the detection of the FM signal when received.

At a receiver 502, the frequency modulated signal is received from the communication channel, step 530. A non-linear process is then applied to an information signal derived from the FM signal, to limit signal amplitude peaks according to a particular noise threshold, thereby generating a conditioned signal. In the preferred embodiment, the received FM signal is demodulated to generate the information signal, step 540. The demodulated signal is then conditioned by applying non-linear processing to limit signal amplitudes based on the noise threshold, step 550. Preferably, the non-linear processing is accomplished using a soft-limiter or a blanker. The condition signal is then processed to determine whether it yields the coded pattern. In the preferred embodiment, the communication signal is determined to contain the coded pattern when the coded pattern correlates with the conditioned signal to yield a correlated signal that satisfies a pattern threshold.

The present invention provides significant benefits over the prior art. By employing a coded pattern, such as a pseudo noise sequence, for signaling, and by conditioning a received signal to limit the impact of large amplitude noise spikes, the probability of detecting the coded pattern is enhanced. This in effect extends the frequency modulation threshold without increasing the probability of falsing.

What is claimed is:

1. A communication device operable to detect a frequency modulated signal, comprising:
   a signal input stage, comprising a demodulator, that provides an information signal representing the frequency modulated signal;
   an FM signal detection system that uses a coded pattern transmitted within the frequency modulated signal to detect the presence of the frequency modulated signal, comprising:
      a non-linear signal conditioner coupled to the information signal and having an output of a conditioned signal representing the information signal with amplitude peaks limited according to a particular threshold; and
      a pattern detector coupled to the conditioned signal and having a pattern detect output based on an application of the coded pattern to the conditioned signal;
      wherein detection of the coded pattern within the conditioned signal represents detection of the presence of the frequency modulated signal.

2. The communication device of claim 1, wherein the signal conditioner comprises a non-linear signal processor.

3. The communication device of claim 2, wherein the signal conditioner comprises a soft-limiter.

4. The communication device of claim 2, wherein the signal conditioner comprises a blanker.

5. The communication device of claim 1, wherein the pattern comprises a pseudo-noise sequence pattern.

6. The communication device of claim 1, wherein the pattern detector comprises a pattern matched filter.

7. An FM receiver, comprising:
   a receiver input stage having an output of a frequency modulated sign the frequency modulated signal having an embedded pseudo noise sequence embedded therein to facilitate detection of the frequency modulated signal;
   a demodulator coupled to the frequency modulated signal and having an output of a demodulated signal;
   a non-linear signal conditioner coupled to the demodulated signal and having an output of a conditioned signal having amplitude peaks limited according to a particular noise threshold; and
   a pattern detector coupled to the conditioned signal and having an output based on detecting the pseudo noise sequence within the conditioned signal;
   wherein detection of the pseudo noise sequence represents detection of the presence of the frequency modulated signal.

8. The receiver of claim 7, wherein the signal conditioner comprises a non-linear signal processor.

9. The receiver of claim 8, wherein the non-linear signal processor comprises a soft-limiter.

10. The receiver of claim 8, wherein the non-linear signal processor comprises a blanker.

11. The receiver of claim 7, wherein the pattern comprises a pseudo-noise sequence.

12. The receiver of claim 11, wherein the pattern detector comprises a pattern matched filter.

13. A method of detecting a frequency modulated signal, comprising:

receiving a frequency modulated signal having a pattern encoded therein for the purpose of enhancing the probability of detecting the frequency modulated signal;

applying a non-linear process to an information signal derived from the frequency modulated signal, to limit signal amplitude peaks according to a particular threshold, thereby generating a conditioned signal representing the frequency modulated signal, wherein the information signal is a demodulated version of the frequency modulated signal; and determining that the frequency modulated signal is detected when the pattern correlates with the conditioned signal according to a pattern match criteria.

14. The method of claim 13, wherein the step of applying a non-linear process comprises the step of processing the information signal using a soft-limiter.

15. The method of claim 13, wherein the step of applying a non-linear process comprises the step of processing the information signal using a blanker.

16. The method of claim 13, wherein the particular threshold is based on noise generated by demodulation of the frequency modulated signal.

17. A communication method for enhanced signaling, comprising the steps of:

at a transmitter:
forming a communication signal using a coded pattern embedded to enhance the probability of detecting the communication signal;
transmitting the communication signal on a communication channel using frequency modulation;

at a receiver:
receiving the communication signal from the communication channel;
generating a conditioned signal by applying non-linear processing to a derivative of the communication signal, after demodulation, to limit signal amplitude peaks according to a particular noise threshold; and
determining that the communication signal is detected when the coded pattern correlates with the conditioned signal to yield a correlated signal according to a particular threshold.

18. A method for extending the range of signaling information transmitted using frequency modulation, comprising the steps of:

at a transmitter:
forming a communication signal using a pseudo noise sequence;
transmitting the communication signal on a communication channel using frequency modulation;

at a receiver:
receiving the communication signal from the communication channel;
generating a conditioned signal by applying non-linear processing to a derivative of the communication signal, after demodulation, to limit signal amplitude peaks according to a particular noise threshold; and
determining that communication activity is present on the communication channel when the pseudo noise sequence correlates with the conditioned signal to yield a correlated signal according to a particular threshold.

* * * * *